US012440420B2

(12) United States Patent
Cao et al.

(10) Patent No.: US 12,440,420 B2
(45) Date of Patent: Oct. 14, 2025

(54) HAND-HELD MUSCLE RELAXATION DEVICE HAVING A POWER SUPPLY ARRANGED TRANSVERSELY

(71) Applicant: SHENZHEN BREO TECHNOLOGY CO., LTD., Guangdong (CN)

(72) Inventors: Shuguang Cao, Guangdong (CN); Yong Wan, Guangdong (CN)

(73) Assignee: SHENZHEN BREO TECHNOLOGY CO., LTD., Shenzhen (CN)

( * ) Notice: Subject to any disclaimer, the term of this patent is extended or adjusted under 35 U.S.C. 154(b) by 752 days.

(21) Appl. No.: 17/289,155

(22) PCT Filed: Mar. 5, 2020

(86) PCT No.: PCT/CN2020/078014
§ 371 (c)(1),
(2) Date: Apr. 27, 2021

(87) PCT Pub. No.: WO2021/062985
PCT Pub. Date: Apr. 8, 2021

(65) Prior Publication Data

US 2022/0211572 A1 Jul. 7, 2022

(30) Foreign Application Priority Data

Sep. 30, 2019 (CN) ........................ 201910944096.X

(51) Int. Cl.
*A61H 23/00* (2006.01)
*A61H 23/02* (2006.01)

(52) U.S. Cl.
CPC ....... *A61H 23/006* (2013.01); *A61H 23/0254* (2013.01); *A61H 2201/0153* (2013.01);
(Continued)

(58) Field of Classification Search
CPC .......... A61H 1/00; A61H 1/006; A61H 1/008; A61H 7/00; A61H 7/003–005;
(Continued)

(56) References Cited

U.S. PATENT DOCUMENTS 4,088,128 A * 5/1978 Mabuchi ............ A61H 23/0254
601/108
4,513,737 A * 4/1985 Mabuchi ............ A61H 23/0254
601/108
(Continued)

FOREIGN PATENT DOCUMENTS

CN 1202850 A 12/1998
CN 207383836 U 5/2018
(Continued)

OTHER PUBLICATIONS

English Translation of "CN 209004666 U", Jun. 21, 2019 (Year: 2019).*
(Continued)

*Primary Examiner* — Justine R Yu
*Assistant Examiner* — Christopher E Miller
(74) *Attorney, Agent, or Firm* — Andrew C. Cheng

(57) ABSTRACT

A hand-held muscle relaxation device includes a power supply arranged transversely which includes a housing; a power supply; a motor; a massage head module and a power conversion mechanism. The power conversion mechanism is mounted inside the housing and the power supply is electrically connected with the motor. The motor is provided with a first rotation axis, and the motor drives the massage head module to perform a linear reciprocating movement along a first axis through the power conversion mechanism. The housing comprises a casing and a handle mounted at a side of the casing. The motor is mounted inside the handle and the power supply is mounted inside the casing. During
(Continued)

working, the motor drives the massage head module to perform a linear reciprocating movement at a higher frequency to achieve an impact, beating, and massage on the human body.

19 Claims, 7 Drawing Sheets

(52) U.S. Cl.
CPC ................ *A61H 2201/1436* (2013.01); *A61H 2201/149* (2013.01); *A61H 2201/1669* (2013.01)

(58) Field of Classification Search
CPC .............. A61H 23/006; A61H 23/0254; A61H 2201/0153; A61H 2201/1436; A61H 2201/149; A61H 2201/1669; A61H 2201/0165; A61H 2201/123; A61H 23/02; A61H 2201/0169; A61H 2201/1207; Y10S 30/01; B25G 1/00; B25G 1/06; B23D 49/16–167; B23D 51/01; B23D 51/10; B23D 51/16; B25F 1/02; B25F 5/02; B25F 3/00; B25B 21/00
USPC ......... 30/519, DIG. 1; 74/45, 49, 50, 69, 70; 601/97, 107, 108, 112
See application file for complete search history.

(56) References Cited

U.S. PATENT DOCUMENTS

| | | | | |
|---|---|---|---|---|
| 5,372,420 | A * | 12/1994 | Van Deursen | B25F 5/02 241/285.2 |
| 5,794,325 | A * | 8/1998 | Fallandy | B25D 11/108 29/566.4 |
| 5,950,268 | A * | 9/1999 | Murphy | A46B 13/02 15/97.1 |
| 6,026,910 | A * | 2/2000 | Masterson | B25F 5/006 267/141.1 |
| 6,228,042 | B1 | 5/2001 | Dungan | |
| 6,467,176 | B1 * | 10/2002 | Frech | B27B 19/12 30/296.1 |
| 6,536,536 | B1 * | 3/2003 | Gass | B25F 5/021 173/171 |
| 6,682,496 | B1 * | 1/2004 | Pivaroff | A61H 23/0254 601/107 |
| 7,435,232 | B2 * | 10/2008 | Liebschner | A61B 5/4509 128/923 |
| 11,357,697 | B2 * | 6/2022 | Wersland | A61H 15/00 |
| 2008/0121074 | A1 * | 5/2008 | Hu | B25G 1/066 81/177.8 |
| 2009/0264940 | A1 * | 10/2009 | Beale | A61B 90/39 606/86 R |
| 2011/0203821 | A1 * | 8/2011 | Puzio | B25F 5/00 173/176 |
| 2011/0266014 | A1 * | 11/2011 | McRoberts | B25F 5/02 173/170 |
| 2012/0160529 | A1 * | 6/2012 | Eshleman | B25F 5/00 173/1 |
| 2013/0008677 | A1 * | 1/2013 | Huifu | B25D 1/00 29/401.1 |
| 2013/0199811 | A1 * | 8/2013 | Maddilate | B25F 5/02 173/170 |
| 2014/0056660 | A1 * | 2/2014 | Eshleman | B23B 51/009 408/9 |
| 2014/0102742 | A1 * | 4/2014 | Eshleman | B25B 21/004 173/183 |
| 2017/0281162 | A1 * | 10/2017 | Shelton, IV | A61B 17/07207 |
| 2018/0200141 | A1 * | 7/2018 | Wersland | A61H 23/006 |
| 2019/0209424 | A1 * | 7/2019 | Wersland | A61H 23/0254 |
| 2019/0254922 | A1 * | 8/2019 | Marton | A61H 23/006 |
| 2019/0365598 | A1 * | 12/2019 | Qu | A61H 15/0085 |
| 2020/0085675 | A1 * | 3/2020 | Lee | A61H 23/006 |
| 2020/0405574 | A1 * | 12/2020 | Wersland | A61H 1/008 |

FOREIGN PATENT DOCUMENTS

| | | | | |
|---|---|---|---|---|
| CN | 108354825 | A | | 8/2018 |
| CN | 207722075 | U | | 8/2018 |
| CN | 109009977 | A | | 12/2018 |
| CN | 109481278 | A | | 3/2019 |
| CN | 109664340 | A | | 4/2019 |
| CN | 209004666 | U | * | 6/2019 |
| CN | 110179646 | A | | 8/2019 |
| CN | 110215384 | A | | 9/2019 |
| CN | 110538061 | A | | 12/2019 |
| CN | 110538062 | A | | 12/2019 |
| CN | 110538063 | A | | 12/2019 |
| CN | 110575381 | A | | 12/2019 |
| CN | 110575382 | A | | 12/2019 |
| CN | 111084714 | A | | 5/2020 |
| WO | 2019055959 | A1 | | 3/2019 |

OTHER PUBLICATIONS https://yohohongking.com, Eleeels X1T Deep Muscle Vibration Massage Gun, Sep. 27, 2019, pp. 1-18.

* cited by examiner

HAND-HELD MUSCLE RELAXATION DEVICE HAVING A POWER SUPPLY ARRANGED TRANSVERSELY

CROSS REFERENCE TO RELATED APPLICATION

The present application claims the priority of Chinese Patent application with Application No. 201910944096.X (titled of a hand-held muscle relaxation device having a power supply arranged transversely), filed on Sep. 30, 2019 to Patent Bureau of China, the entire content of which are incorporated in the present application by reference.

BACKGROUND

1. Technical Field

The present application relates generally to health care equipment, and more particularly to a hand-held muscle relaxation device having a power supply arranged in an advantageous manner.

2. Related Art

Hand-held muscle relaxation devices (such as muscle fascia relaxation massage gun, English name: Fascia Gun) is a high-frequency impact physiotherapy tool for relaxation. The hand-held muscle relaxation device can produce 2000-3000 vibrations per minute. The motor drives the massage head module to impact the target portion of the human body to help the muscles and soft tissues to relax and recover, and to promote blood circulation; at the same time, it effectively dissipates the large amount of creatine produced by the fatigue due to exercise, work and life, and has a very good effect of relieving body fatigue; further, its high-frequency oscillation effect can penetrate deep skeletal muscles to relax the skeletal muscles instantaneously, and instantly smooth the meridian nerves and blood vessels.

SUMMARY

One object is to provide a hand-held muscle relaxation device having a power supply arranged transversely, with the advantage of solving the technical problem of how to convert the high-speed rotation movement of the motor into the linear reciprocating movement of the massage head module.

In order to solve above technical problem, the present application adopts the technical solution to provide a hand-held muscle relaxation device having a power supply arranged transversely, including a housing; a power supply; a motor; a massage head module and a power conversion mechanism; the power conversion mechanism is mounted inside the housing, the power supply is electrically connected with the motor, the motor is provided with a first rotation axis, and the motor drives the massage head module to perform a linear reciprocating movement along a first axis through the power conversion mechanism, the housing comprises a casing and a handle mounted at a side of the casing, the motor is mounted inside the handle and the power supply is mounted inside the casing.

In an embodiment, an included angle is formed between the first rotation axis and the first axis.

In an embodiment, the casing is arranged along the first axis and an included angle is formed between the handle and the casing.

In an embodiment, the handle is rotatably connected to the casing, and the handle is provided with a second rotation axis.

In an embodiment, the second rotation axis is perpendicular to the first axis.

In an embodiment, a rotation movement of the handle is restricted by a locking mechanism, the locking mechanism has a locked state and an unlocked state, and the handle is locked to fix relative to the casing when in the locked state, and the handle is released when in the unlocked state.

In an embodiment, the locking mechanism comprises a rotation stopper, an elastic member, and a driving member, one of the casing and the handle is provided with a sliding groove configured for the rotation stopper to move, and another of the casing and the handle is provided with a rotation stop groove, the elastic member is able to reset the rotation stopper, and the driving member is linked with the rotation stopper; when in the locked state, the rotation stopper is engaged in the rotation stop groove, and the elastic member is elastically deformed; when in the unlocked state, the rotation stopper exits the rotation stop groove.

In an embodiment, a part of the handle mounted on the side of the casing is an opening portion, a bracket is fixed inside the opening portion, and the motor is fixed with the bracket.

In an embodiment, a first soft rubber block is provided between the bracket and the opening portion of the handle; and a second soft rubber block is provided between the bracket and the motor.

In an embodiment, the side of the casing is fixed with a base, the bracket is suspended below the base, and the bracket is rotatably connected to the base, the bracket is provided with a second rotation axis and an upper spherical surface facing the base, and the base is correspondingly provided with a lower spherical surface configured for fitting with the upper spherical surface, the second rotation axis passes through centers of the upper spherical surface and the lower spherical surface.

In an embodiment, a third soft rubber block is provided between the base and the casing, and a fourth soft rubber block is provided between the base and the bracket.

In an embodiment, the power conversion mechanism comprises a universal coupling capable of realizing variable-angle power transmission and a crank-slider mechanism capable of converting a rotary movement into a linear reciprocating movement, the bracket is provided with a mounting space, and the universal coupling is located in the mounting space; the universal coupling is provided with an input member configured for receiving a rotational power and an output member configured for outputting the rotational power; the crank-slider mechanism is provided with a crank configured for performing a rotational movement and a moving shaft configured for performing a linear reciprocating movement; the motor is fixed with the input member, and the output member is fixed with the crank; the crank drives the moving shaft to perform the linear reciprocating movement along the first axis, and the massage head module is mounted at a front of the moving shaft.

In an embodiment, the universal coupling comprises an upper rotating bracket, a lower rotating bracket and a rotating block, and the upper rotating bracket is provided with an upper mounting shaft extended upwardly, and the lower rotating bracket is provided with a lower mounting shaft extended downwardly, the lower mounting shaft is the input member, the upper mounting shaft is the output member, and the upper mounting shaft is fixed to the crank, the lower mounting shaft is fixed to the motor; the rotating block is hinged with the upper rotating bracket through the upper rotating shaft, the rotating block is hinged with the lower rotating bracket through the lower rotating shaft, and an axis of the upper rotating shaft is perpendicular to that of the lower rotating shaft.

In an embodiment, an external of the moving shaft is covered with a shaft sleeve, an external of the shaft sleeve is covered with a soft rubber shock-absorbing sleeve, and the shock-absorbing sleeve is fixed with the casing.

The beneficial effects of the hand-held muscle relaxation device provided by the embodiments include: 1) the power conversion mechanism is provided, which can convert the high-speed rotational movement of the motor into the linear reciprocating movement of the massage head module, thereby realizing the high-frequency impact beat massage; 2) the motor is elastically supported inside the casing through the first and second soft rubber blocks, thereby having a shock-absorbing effect; 3) and the handle can be rotated relative to the casing, so that the relaxation device can be applied to different body parts to be impacted and beaten by adjusting the position of the handle.

THE DRAWINGS

In order to explain the embodiments more clearly, a brief introduction regarding the accompanying drawings that need to be used for describing the embodiments of the present application or the prior art is given below; it is obvious that the accompanying drawings described as follows are only some embodiments of the present application, for those skilled in the art, other embodiments can also be obtained and are contemplated within the scope of the invention as set forth in the accompanying claims, in which:

DETAILED DESCRIPTION

Figure 1:
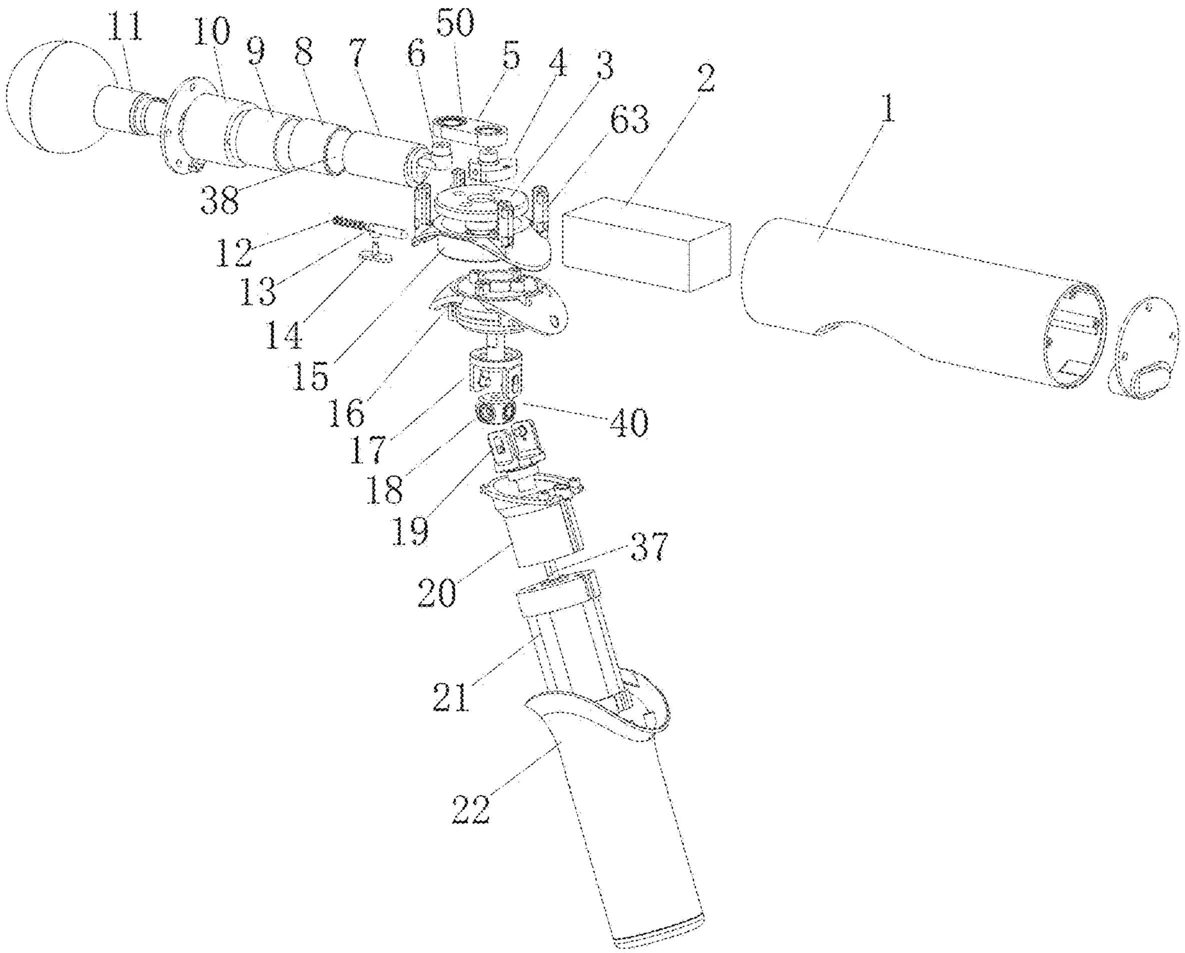
FIG. 1 is an exploded perspective view of a hand-held muscle relaxation device having a power supply arranged transversely provided by an embodiment of the present application.
Figure 2:
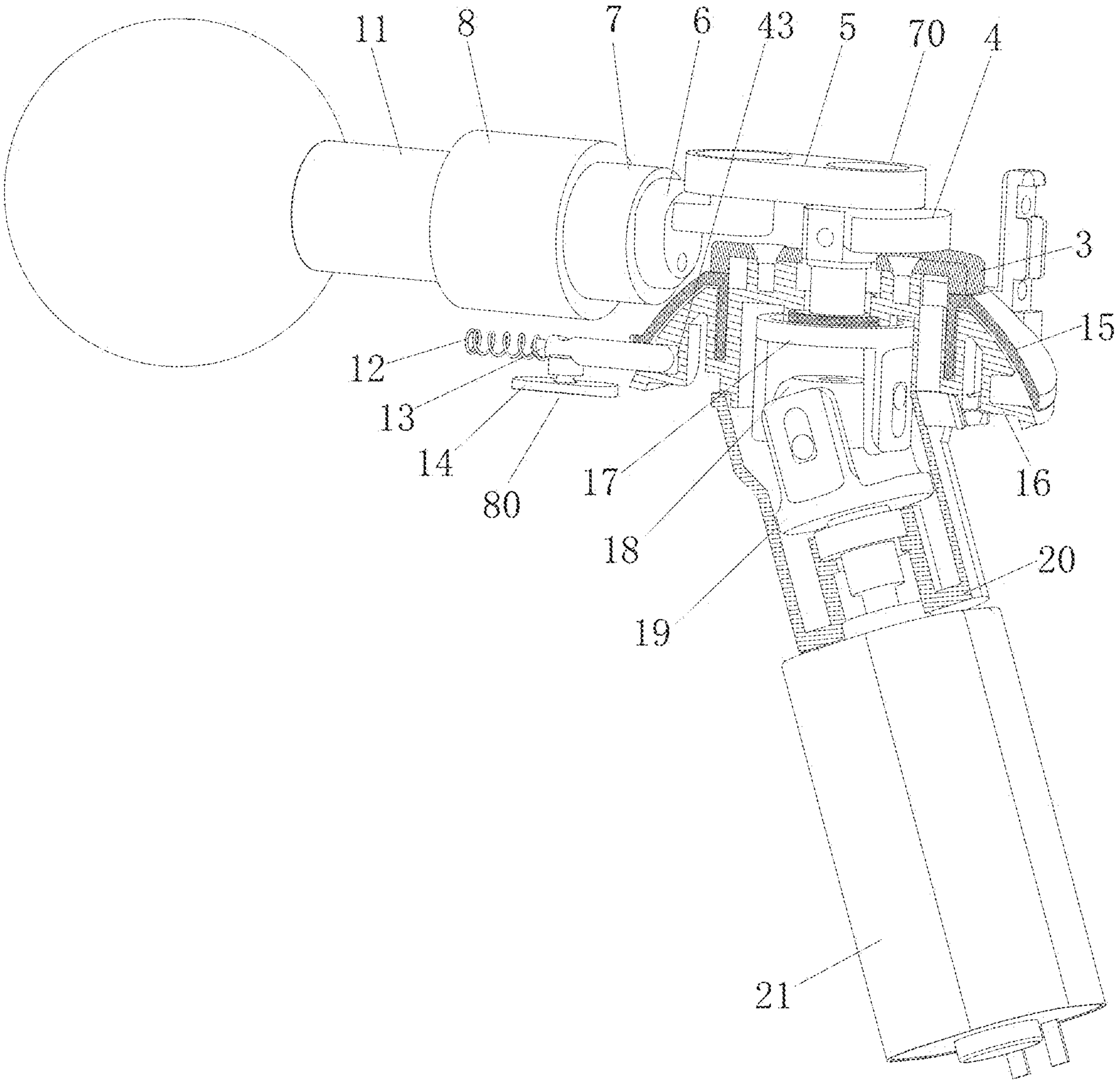
FIG. 2 is a perspective view of a hand-held muscle relaxation device having a power supply arranged transversely provided by an embodiment of the present application.
Figure 3:
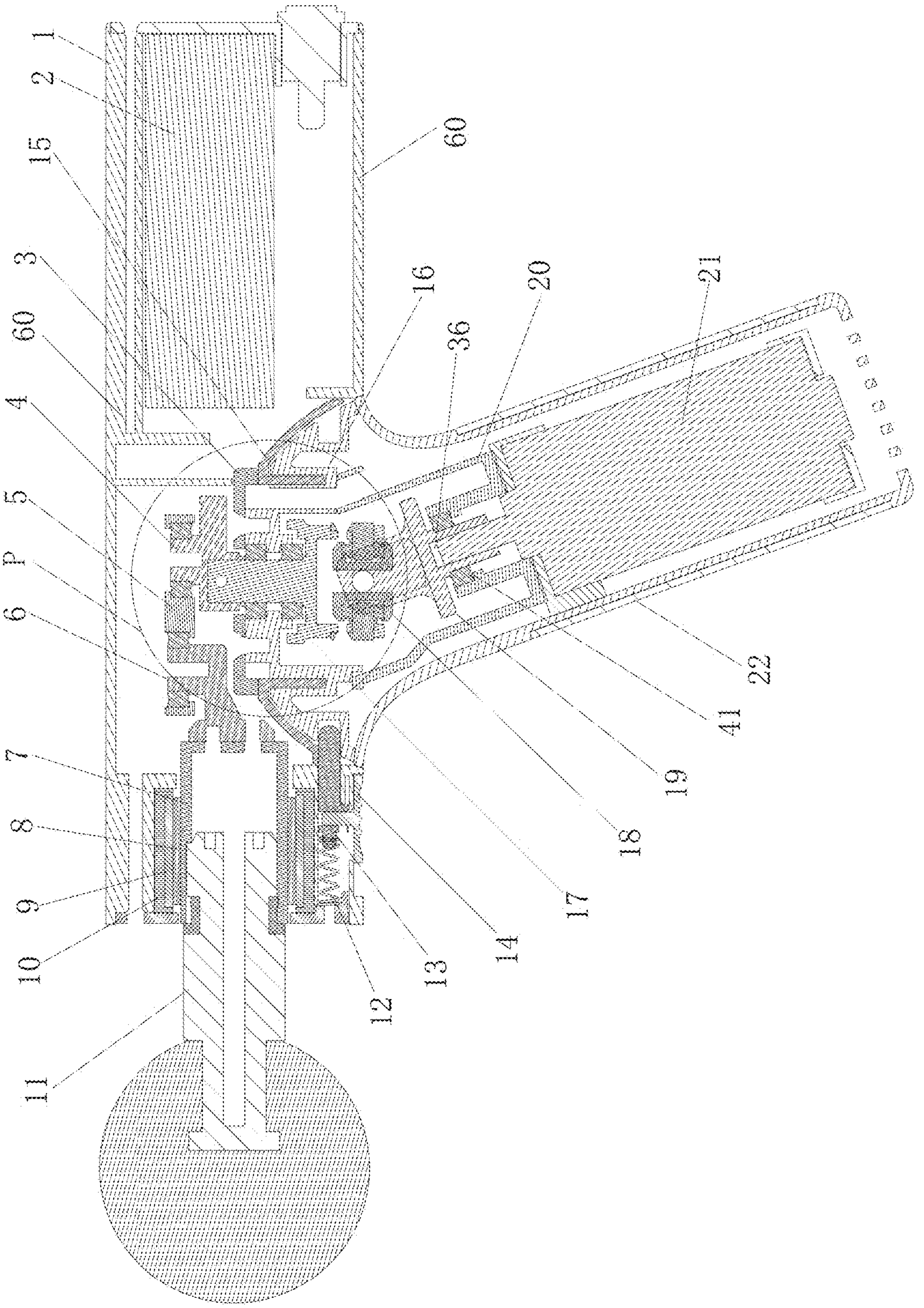
FIG. 3 is a cross-sectional view of a handle of a hand-held muscle relaxation device having a power supply arranged transversely before rotating provided by an embodiment of the present application.
Figure 4:
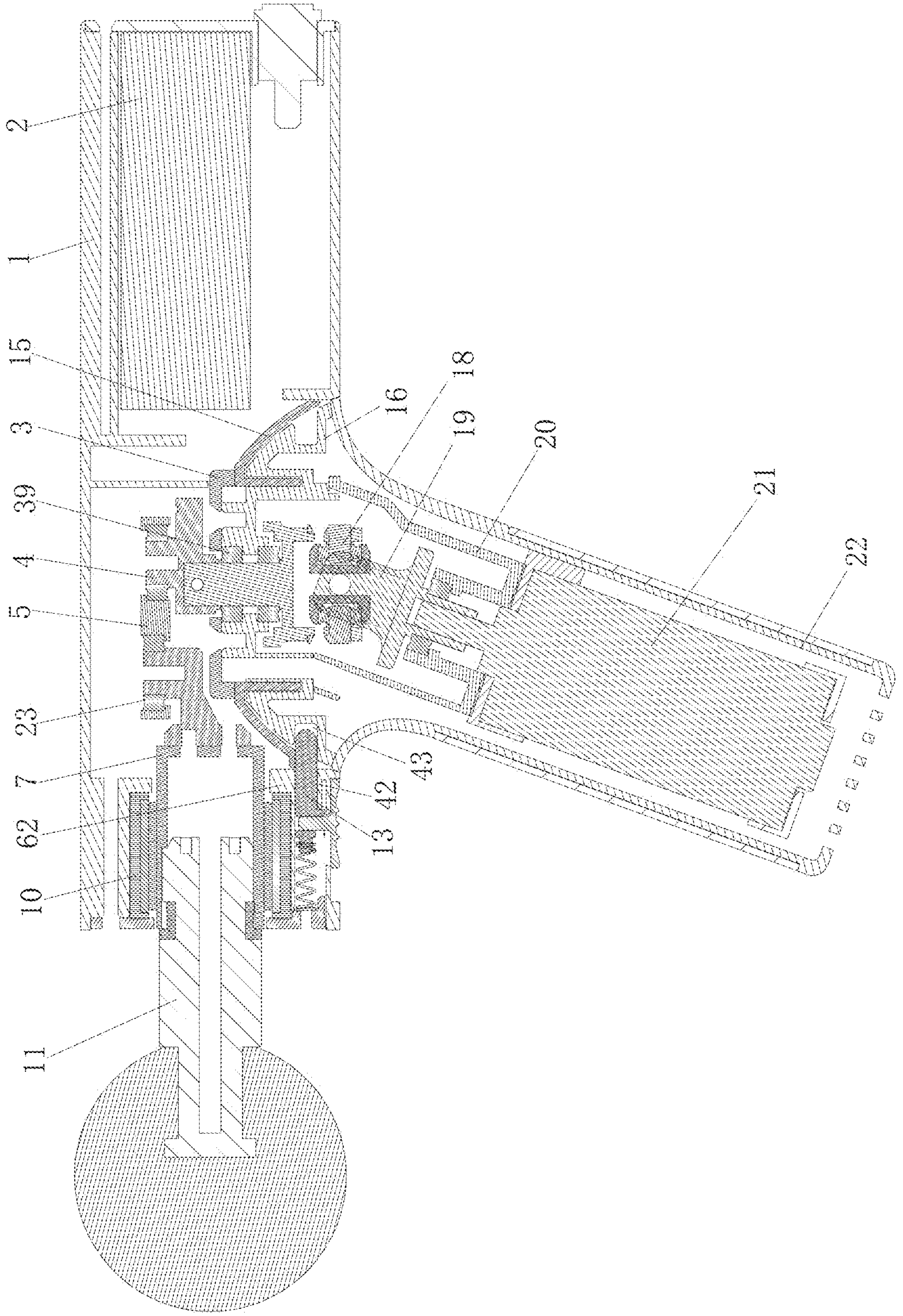
FIG. 4 is a cross-sectional view of a handle of a hand-held muscle relaxation device having a power supply arranged transversely after rotating provided by an embodiment of the present application.
Figure 5:
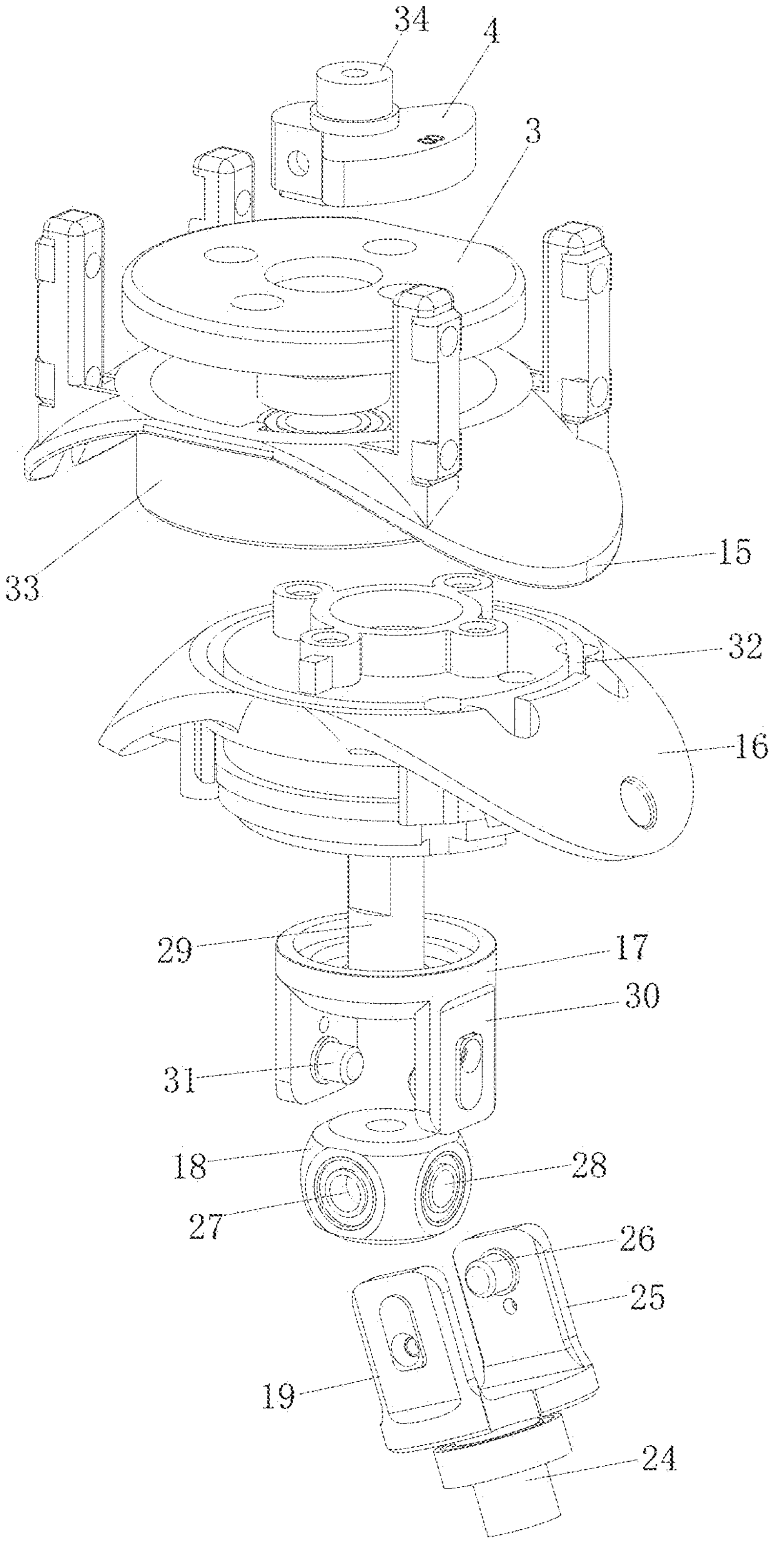
FIG. 5 is a structural perspective view of a universal coupling, an upper bracket, a base and a rotation cover of a hand-held muscle relaxation device having a power supply arranged transversely provided by an embodiment of the present application.
Figure 6:
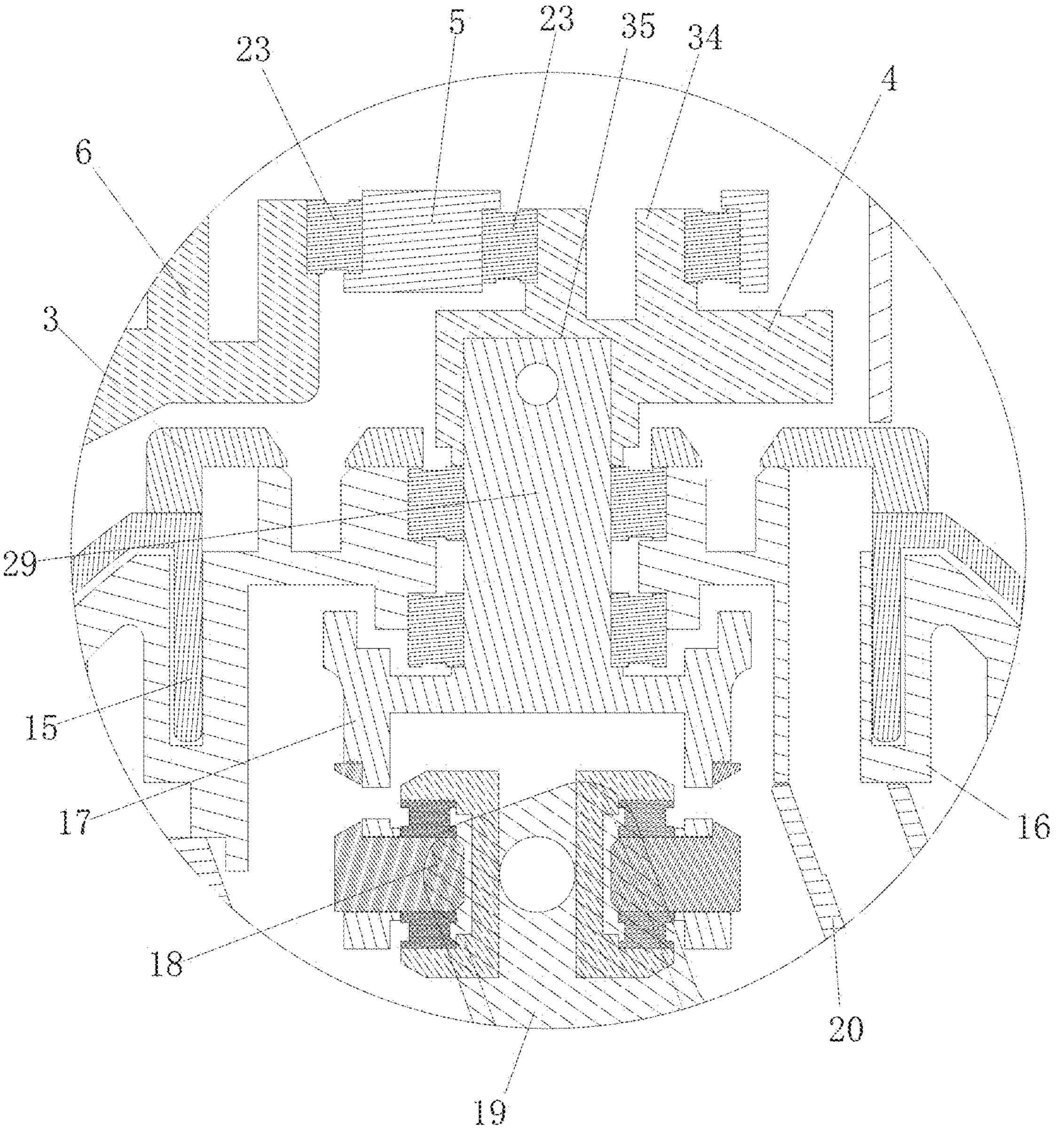
FIG. 6 is a partial enlarged view of an area pointed by P in FIG. 3.

In order to make the objects, technical solutions, and advantages of the present application clearer, the following further describes the present application in detail with reference to the accompanying drawings and embodiments. It should be understood that the specific embodiments described here are only used to explain the present application, and are not used to limit the present application. The invention is define by the claims. It should be noted that the directions or positional relationships indicated by the terms "upper", "lower", "left", "right", etc. are based on the directions or positional relationships shown in the drawings, and are only for ease of description, rather than indicating or implying that the device or element referred to must have a specific orientation, be constructed and operated in a specific orientation, and therefore cannot be understood as a limitation of the invention. For those skilled in the art, the specific meaning of the above terms can be understood according to the specific circumstances. The terms "first" and "second" are only used for ease of description, and cannot be understood as indicating or implying relative importance or implicitly indicating the number of technical features. The meaning of "plurality" means two or more than two, unless otherwise specifically defined.

As shown in FIGS. 1 to 6, the hand-held muscle relaxation device is provided having a power supply arranged transversely, which includes a housing 60, a power supply 2, a motor 21, a massage head module 11, and a power conversion mechanism. The power conversion mechanism is mounted inside the housing 60. The power supply 2 is electrically connected to the motor 21. The motor 21 is provided with a first rotation axis. The motor 21 drives the massage head module 11 to perform a linear reciprocating movement along a first axis through the power conversion mechanism. The housing 60 includes casing 1 and a handle 22 mounted on the lower side of casing 1. The motor 21 is mounted inside the handle 22, and the power supply 2 is mounted inside the casing 1. During working or use, the user holds the handle 22 of the relaxation device, and the motor 21 drives the massage head module 11 to perform a linear reciprocating movement at a higher frequency to achieve an impact, beating, and massage on the human body.

In this embodiment, the casing 1 is arranged transversely along the first axis, and the power supply 2 can be arranged transversely inside the casing.

As shown in FIGS. 1 to 6, a hand-held muscle relaxation device includes the housing 60, a machine core 70 and the massage head module 11. The machine core 70 is mounted inside the housing 60, and the massage head module 11 is located outside of the housing 60. The machine core 70 drives the massage head module 11 to perform a linear reciprocating movement along a first axis to achieve impact and beating on the human body. The machine core 70 includes the power supply 2, the motor 21, a universal coupling 40 and a crank-slider mechanism 50. The power supply 2 supplies power to the motor 21. The motor 21 can provide rotational power. The universal coupling 40 can realize variable-angle power transmission, and has an input member capable of receiving the rotational power and an output member capable of outputting the rotational power. The crank-slider mechanism 50 can convert a rotary movement into a linear reciprocating movement, and has a crank 4 capable of performing the rotary movement and a moving shaft 7 capable of performing the linear reciprocating movement.

The output member of the universal coupling 40 is connected to the crank 4 and drives the crank 4 to rotate around a second rotation axis. The power source 21 is connected to the input member of the universal coupling 40 and drives the input member to rotate around the first rotation axis. The crank 4 drives the moving shaft 7 to perform a linear reciprocating movement along the first axis, and the massage head module 11 is mounted at the front of the moving shaft 7. The first axis can be perpendicular to the human body to be impacted and beaten, the first rotation axis can be inclined with respect to the first axis, and the included angle between the second rotation axis and the first rotation axis can be an acute angle. The second rotation axis can be perpendicular to the first axis.

Further, the housing 60 may include the casing 1 and the handle 22. The handle 22 is convenient for the user to hold and is mounted on the lower side of the casing 1. The casing 1 can be arranged transversely along the first axis, and the handle 22 can be arranged obliquely relative to the casing 1, so that an acute angle is formed between the handle 22 and the casing 1. The power supply 2 and the crank-slider mechanism 50 can be mounted inside the casing 1, and the motor 21 can be mounted inside the handle 22.

Further, the handle 22 can rotate relative to the casing 1 around the second rotation axis. The handle 22 has at least one rotational position relative to the casing 1. In any rotational position, the handle 22 is positioned by the locking mechanism 80. The locking mechanism 80 has a locked state and an unlocked state. During the rotation, the locking mechanism 80 releases the handle 22 so that the handle 22 can rotate relative to the casing 1. After the rotation is in place, the locking mechanism 80 switches to the locked state, and the locking mechanism 80 locks the handle 22 to prevent handle 22 from rotating relative to casing 1.

As shown in FIGS. 1 to 6, the hand-held muscle relaxation device includes the housing 60, the massage head module 11 and the machine core 70. The massage head module 11 is located outside the housing 60, and the machine core 70 is mounted inside the housing 60. The machine core 70 drives the massage head module 11 to perform a linear reciprocating movement along the first axis at a certain frequency.

The machine core 70 includes the battery 2, the motor 21, the universal coupling 40 and the crank-slider mechanism 50. The battery 2 supplies power to motor 21. The motor 21 has a motor shaft 37, which outputs rotational power through the motor shaft. The universal coupling 40 includes a lower rotating bracket 19, a rotating block 18 and an upper rotating bracket 17. The lower rotating bracket 19 includes a lower mounting shaft 24 and a lower support seat 25. The lower mounting shaft 24 extends downwardly from the bottom of the lower support seat 25. The lower support seat 25 is general in a U-shaped, and the lower support seat 25 has a pair of lower rotating shafts 26 extending opposite each other. The upper rotating bracket 17 includes an upper mounting shaft 29 and an upper support seat 30. The upper mounting shaft 29 extends upwardly from the top of the upper support seat 30. The upper support seat 30 is general in a U-shaped. The upper support seat 30 has a pair of upper rotating shafts 31 extending opposite to each other. The two lower rotating shafts 26 are co-axial and two upper rotating shafts 31 are co-axial. The axis of the upper rotating shaft 31 and the axis of the lower rotating shaft 26 can intersect and be perpendicular. The rotating block 18 includes a pair of upper shaft holes 28 corresponding to the upper rotating shafts 31 and a pair of lower shaft holes 27 corresponding to the lower rotating shafts 26. The two upper rotating shafts 31 are respectively fitted with the two upper shaft holes 28, and two lower rotating shafts 26 are respectively fitted with the two lower shaft holes 27, so that the upper rotating bracket 17 and the lower rotating bracket 19 are hinged through the rotating block 18 and the upper and lower rotating brackets can rotate relative to each other, thereby forming the universal coupling that can realize variable-angle power transmission. The lower mounting shaft 24 of the lower rotating bracket 19 can receive rotational power and has a matching hole 36, and the matching hole 36 is tightly fitted with the motor shaft 37 so that the motor shaft 37 can drive the lower rotating bracket 19 to rotate around the first rotation axis. The first rotation axis is the axis of the motor shaft and the lower mounting shaft. The upper mounting shaft 29 of the upper rotating bracket 17 can output rotating power. The axis of the upper mounting shaft 29 can be perpendicular to the axis of the upper rotating shaft 31, the axis of the lower mounting shaft 24 can be perpendicular to the axis of the lower rotating shaft 26, and the included angle between the axis of the upper mounting shaft 29 and the axis of the lower mounting shaft 24 can be an acute angle.

The crank-slider mechanism 50 includes the crank 4, the moving shaft 7, and a connecting rod 5 capable of transmitting the power of the crank 4 to the moving shaft 7. The crank 4 has an upper surface and a lower surface opposite to each other. The lower surface has the matching hole 35 which is tightly fitted with the upper mounting shaft 29 of the upper rotating bracket 17 so that the upper rotating bracket 17 can drive the crank 4 to rotate around the second rotation axis, the second rotation axis is the axis of the upper mounting shaft 29. The upper surface of the crank 4 has an eccentric shaft 34 extended upwardly, and the axis of the eccentric shaft 34 is parallel to the axis of the upper mounting shaft 29. The connecting rod 5 has a first front part and a first rear part opposite to each other. The eccentric shaft 34 is hinged to the first rear part through a bearing 23; the first front part is hinged to an adapter frame 6 through another bearing 23, and the adapter frame 6 is fixed at the rear of the moving shaft 7, the axes of the two bearings 23 are parallel and both are parallel to the axis of the upper mounting shaft 29.

The external of the moving shaft 7 is covered with a shaft sleeve 8, the external of the shaft sleeve 8 is covered with a shaft sleeve seat 9, and the external of the shaft sleeve seat 9 is covered with a soft rubber shock-absorbing sleeve 10. The shock-absorbing sleeve 10 is fixed with the housing 60. The shaft sleeve 8 is provided with a linear track 38 penetrating back and forth along the first axis. The moving shaft 7 is fitted with the linear track 38.

The housing 60 may include the casing 1 and the handle 22, and the handle 22 is located on the lower side of the casing 1, which is convenient for the user to hold. The casing 1 may have a substantially cylindrical shape, which is arranged transversely along the first axis. The handle 22 may have a substantially cylindrical shape, and it is arranged obliquely with respect to the casing 1. The included angle between the axis of the handle 22 and the axis of the casing 1 may be an acute angle. The motor 21 can be mounted inside the handle 22, and the crank-slider mechanism 50 and the battery 2 can be mounted inside the casing 1.

A lower bracket 20 is mounted inside the handle 22 by fasteners. The motor 21 is fixed to the lower bracket 20. The lower bracket 20 and the upper bracket 16 are fixed by fasteners and a mounting space is formed between them. The universal coupling 40 is mounted inside the mounting space. The upper mounting shaft 29 of the universal coupling extends upwardly from the upper bracket 16 and then is fixed to the crank 4, and the lower mounting shaft 24 of the universal coupling extends downwardly from the lower bracket 20 and then is fixed to the motor shaft 37. The handle 22, the lower bracket 20, the universal coupling 40 and the upper bracket 16 are assembled to form a handle module. The upper mounting shaft 29 of the universal coupling can be fixed to the inner ring of the bearing 39, and the outer ring of the bearing 39 can be fixed to the upper bracket 16, and the axis of the bearing 39 is the second rotation axis. The lower mounting shaft 24 of the universal joint can be fixed to the inner ring of the bearing 41, and the outer ring of the bearing 41 can be fixed to the lower bracket 20. The axis of the bearing 41 is the first rotation axis.

The upper bracket 16 and the lower bracket 20 are fixedly connected to form an integral bracket, through which the universal coupling 40 and the motor 21 are mounted on the handle 22, and the angle of the universal coupling 40 can be restricted. The upper bracket and the handle can be fixedly connected through the upper bracket, the silicone blocks and the screws. The lower bracket can be fixed to the end surface of the motor through the lower bracket, silicone blocks and screws.

The casing 1 is provided with an opening portion on the lower side, and the base 15 is fixed on the opening portion 62 of the casing. A soft rubber block 63 can be added between the opening portion 62 and the base 15 to reduce or avoid the vibration of the handle from being transmitted to the casing 1 through the base 15. A soft rubber block can also be added between the base 15 and the bracket 16 to reduce the vibration sensation transmitted by the motor through the direct contact between the base 15 and the bracket 16. The soft rubber block can be made of silica gel or other soft plastic or rubber.

In an improved structure, the handle module can rotate around the second rotation axis, and after being rotated in place, the handle 22 is locked by the locking mechanism 80. The locking mechanism 80 has an unlocked state and a locked state. In the locked state, the handle 22 is locked and fixed relative to the casing 1; in the unlocked state, the handle 22 can rotate relative to the casing 1. The upper bracket 16 has an annular matching groove 32 on the upper surface. A base 15 is provided above the upper bracket 16, and the base 15 is fixed inside the lower opening of the casing 1 by fasteners. The side of the base 15 facing the upper bracket 16 is provided with an annular matching wall 33 surrounding the second rotation axis. The matching wall 33 cooperates with the matching groove 32, and the axis of the matching wall and the matching groove is the second rotation axis. In order to facilitate the rotation of the handle module, the surfaces of the upper bracket 16 and the base 15 facing each other can be spherical arc surfaces. A rotation cover 3 is arranged above the base 15. The rotation cover 3 is fixed with the upper bracket 16 and the entire handle module is suspended below the base 15, and the handle module can rotate relative to the base 15 around the second rotation axis.

The locking mechanism 80 includes an elastic member 12, a rotation stopper 13, and a driving member 14. The bottom of the casing 1 is provided with a linear sliding cavity 42, the rotation stopper 13 is slidably mounted in the sliding cavity 42, the rear of the rotation stopper 13 is connected with the elastic member 12, and the driving member 14 is linked with the rotation stopper 13. The elastic member 12 is such as a spring. The upper bracket 16 is provided with at least one rotation stop groove 43, and each rotation stop groove 43 corresponds to a rotational position of the handle module. In the locked state, under the elastic force of the elastic member 12, the front part of the rotation stopper 13 protrudes from the sliding cavity 42 and then engages into the rotation stop groove 43, so that the handle module and the casing 1 are relatively fixed. When it is necessary to release the locking, the driving member 14 is moved backwardly to overcome the elastic force of the elastic member 12, so that the front part of the rotation stopper 13 exits the rotation stop groove 43, and the handle module can continue to rotate relative to the casing 1.

Figure 7:
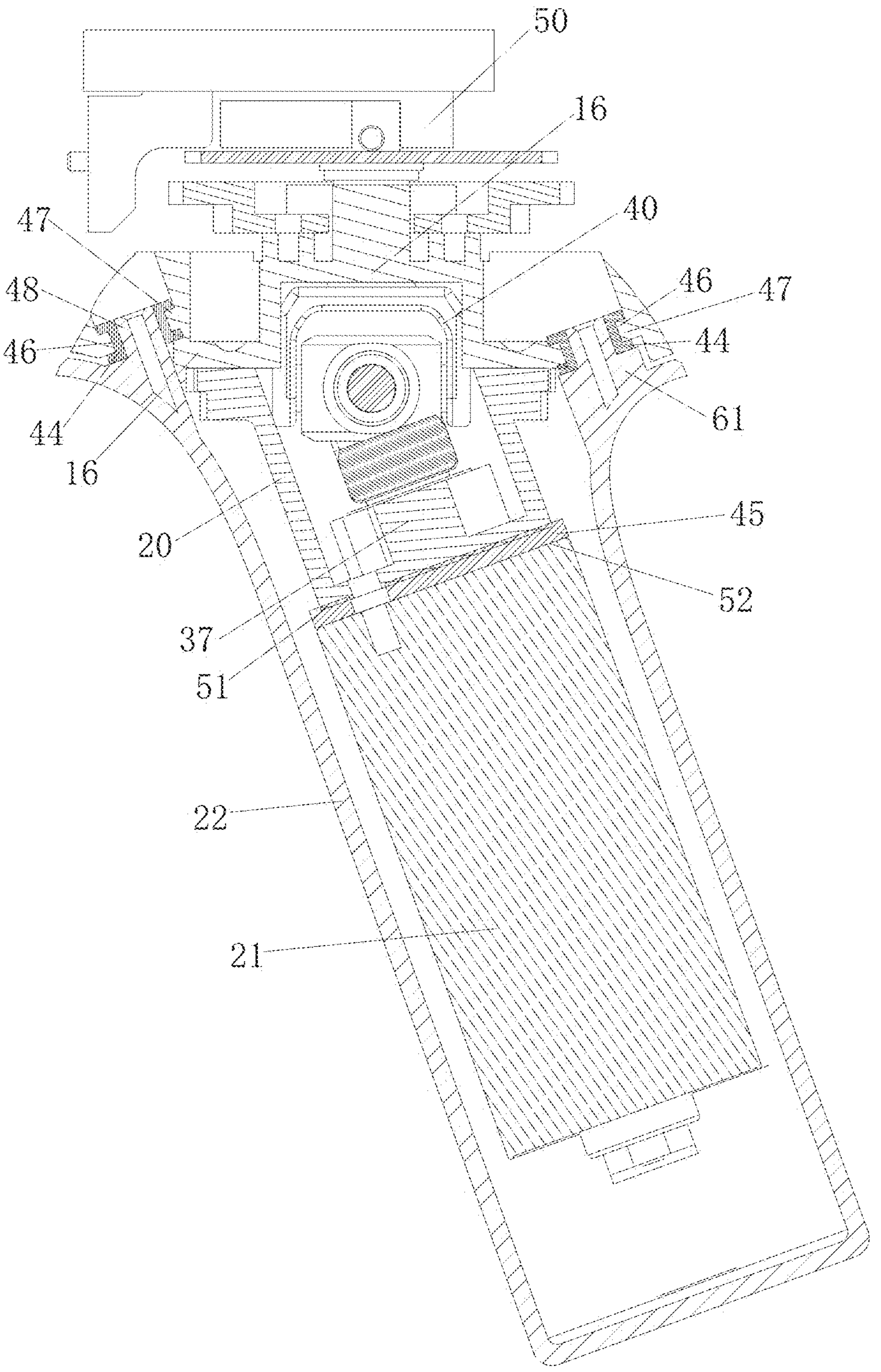
FIG. 7 is a cross-sectional view of a hand-held muscle relaxation device having a power supply arranged transversely provided by another embodiment of the present application.

As shown in FIG. 7, a second specific embodiment of a hand-held muscle relaxation device is provided. The hand-held muscle relaxation device includes a housing, a massage head module and a machine core. The massage head module is located outside the housing, the machine core is mounted inside the housing, and the machine core drives the massage head module to perform a linear reciprocating movement along the first axis at a certain frequency.

The machine core includes a battery, a motor 21, a universal coupling 40 and a crank-slider mechanism 50. The battery supplies power to the motor 21. The motor 21 has a motor shaft, which outputs rotational power through the motor shaft. The universal coupling 40 can realize variable-angle power transmission, and has an input member capable of receiving rotational power and an output member capable of outputting rotational power. The motor 21 drives the input member to rotate around the first rotation axis, and drives the output member to rotate around the second rotation axis, the included angle between the second rotation axis and the first rotation axis can be an acute angle. The output member of the universal coupling 40 is connected to the crank-slider mechanism, and the crank-slider mechanism can convert a rotary movement into a linear reciprocating motion. The motor, the universal coupling, the crank slider mechanism and the massage head module are sequentially power connected. The universal coupling 40 and the crank-slider mechanism 50 constitute the power conversion mechanism, and the power conversion mechanism can convert the rotary movement of the motor into the linear reciprocating movement of the massage head module.

The housing includes a casing and a handle 22 mounted on the lower side of the casing. A lower bracket 20 is fixed inside the handle. The upper bracket 16 and the lower bracket 20 are fixed by fasteners and a mounting space is formed between the two. The universal coupling 40 is mounted in the mounting space, and the input member can extend downwardly from the lower bracket 20 and be fixed to the motor shaft, and its output member can extend upwardly from the upper bracket 16 and be fixed to the slider of the crank-slider mechanism.

The top of the handle is provided with an opening portion 61 connected to the lower side of the casing, the upper bracket 16 is fixedly connected to the opening portion by fasteners, and a first soft rubber block 44 is provided between the opening portion and the corresponding mating end surface of the upper bracket. The lower bracket 20 is fixedly connected to the motor 21 by fasteners, and a second soft rubber block 45 is provided between the corresponding end surfaces of the lower bracket 20 and the motor 21.

In this embodiment, the opening portion 61 has at least one mounting post 48, the cross section of the first soft rubber block 44 is an I-shape, the first soft rubber block 44 is tightly sleeved on the mounting post 48, and the first soft rubber block 44 has a ring-shaped groove 46. The upper bracket 16 is provided with a clamping block 47 which is snap-fitted with the ring-shaped groove. The motor has an upper mating end surface 52, and the motor shaft extends out of the upper mating end surface 52. The lower bracket 20 has a lower mating end surface 51 correspondingly. The second soft rubber block 45 may be a plate-shaped body, which is fixed between the upper mating end surface 52 and the lower mating end surfaces 51. The fastener can pass through the second soft rubber block to lock the lower bracket 20 on the motor 21.

In this embodiment, the upper bracket and the lower bracket are fixed by fasteners, and then fixed with the end surface of the motor through the second soft rubber block to form an integral part, and then the integral part is fixed to the handle by the first soft rubber block, such that there is no direct hard contact between the integral part and the handle, thereby achieving the purpose of suspending and damping the motor.

The aforementioned embodiments are only representative embodiments of the present invention, and should not be regarded as being limiting of the present invention. Any modification, equivalent replacement, improvement, and so on, which are made within the spirit and the principle of the present invention, are included with in the scope of the present invention as set forth in the claims.

What is claimed is:

1. A hand-held muscle relaxation device, comprising: a housing; a power supply; a motor; a massage head module and a power conversion mechanism;

wherein the power conversion mechanism is mounted inside the housing, the power supply is electrically connected with the motor, the motor is provided with a first rotation axis, and the motor drives the massage head module to perform a linear reciprocating movement along a first axis through the power conversion mechanism, the housing comprises a casing and a handle mounted at a side of the casing, the motor is mounted inside the handle and the power supply is mounted inside and transverse to the casing;

wherein the casing is arranged along the first axis and;

wherein the handle is rotatably connected to the casing and rotatable about a second rotation axis relative to the casing; and wherein a first angle is formed between the first rotation axis and the first axis, a second angle is formed between the first rotation axis and the second rotation axis, the first angle is an acute or obtuse angle, and the second angle is an acute angle.

2. The hand-held muscle relaxation device according to claim 1, wherein an end of the motor is connected to the housing via a bracket and an opposite end of the motor is suspended in the handle.

3. The hand-held muscle relaxation device according to claim 1, wherein the handle is slanted relative to the casing.

4. The hand-held muscle relaxation device according to claim 1, wherein the second rotation axis is perpendicular to the first axis; and a sum of the first angle and the second angle is equal to 90 degrees or a difference of the first angle and the second angle is equal to 90 degrees.

5. The hand-held muscle relaxation device according to claim 1, wherein a rotation movement of the handle is restricted by a locking mechanism, the locking mechanism has a locked state and an unlocked state, and the handle is locked to fix relative to the casing when in the locked state, and the handle is released when in the unlocked state.

6. The hand-held muscle relaxation device according to claim 5, wherein the locking mechanism comprises a rotation stopper, an elastic member, and a driving member, one of the casing and the handle is provided with a sliding groove configured for the rotation stopper to move, and another of the casing and the handle is provided with a rotation stop groove, the elastic member is able to reset the rotation stopper, and the driving member is linked with the rotation stopper; when in the locked state, the rotation stopper is engaged in the rotation stop groove, and the elastic member is elastically deformed; when in the unlocked state, the rotation stopper exits the rotation stop groove.

7. The hand-held muscle relaxation device according to claim 1, wherein a part of the handle mounted on the side of the casing is an opening portion, a bracket is fixed inside the opening portion, and the motor is fixed with the bracket.

8. The hand-held muscle relaxation device according to claim 7, wherein a first rubber block is provided between the bracket and the opening portion of the handle; and a second rubber block is provided between the bracket and the motor.

9. The hand-held muscle relaxation device according to claim 7, wherein the side of the casing is fixed with a base, the bracket is suspended below the base, and the bracket is rotatably connected to the base, the bracket is provided with an upper spherical surface facing the base, and the base is correspondingly provided with a lower spherical surface configured for fitting with the upper spherical surface, the second rotation axis passes through centers of the upper spherical surface and the lower spherical surface.

10. The hand-held muscle relaxation device according to claim 9, wherein a third rubber block is provided between the base and the casing, and a fourth rubber block is provided between the base and the bracket.

11. The hand-held muscle relaxation device according to claim 9, wherein the power conversion mechanism comprises a universal coupling capable of realizing variable-angle power transmission and a crank-slider mechanism capable of converting a rotary movement into the linear reciprocating movement, the bracket is provided with a mounting space, and the universal coupling is located in the mounting space; the universal coupling is provided with an input member configured for receiving a rotational power and an output member configured for outputting the rotational power; the crank-slider mechanism is provided with a crank configured for performing a rotational movement and a moving shaft configured for performing the linear reciprocating movement; the motor is fixed with the input member, and the output member is fixed with the crank; the crank drives the moving shaft to perform the linear reciprocating movement along the first axis, and the massage head module is mounted at a front of the moving shaft.

12. The hand-held muscle relaxation device according to claim 11, wherein the moving shaft is covered with a shaft sleeve; the shaft sleeve is covered with a rubber shock-absorbing sleeve, and the shock-absorbing sleeve is fixed with the casing.

13. A hand-held muscle relaxation device, comprising: a housing; a power supply: a motor; a massage head module and a power conversion mechanism;

wherein the power conversion mechanism is mounted inside the housing the power supply is electrically connected with the motor, the motor is provided with a first rotation axis, and the motor drives the massage head module to perform a linear reciprocating movement along a first axis through the power conversion mechanism, the housing comprises a casing and a handle mounted at a side of the casing, the motor is mounted inside the handle and the power supply is mounted inside and transverse to the easing;

wherein a part of the handle mounted on the side of the casing is an opening portion, a bracket is fixed inside the opening portion, and the motor is fixed with the bracket;

wherein the power conversion mechanism comprises a universal coupling capable of realizing variable-angle power transmission and a crank-slider mechanism capable of converting a rotary movement into the linear reciprocating movement, the bracket is provided with a mounting space, and the universal coupling is located in the mounting space;

the universal coupling is provided with an input member configured for receiving a rotational power and an output member configured for outputting the rotational power;

the crank-slider mechanism is provided with a crank configured for performing a rotational movement and a moving shaft configured for performing the linear reciprocating movement; the motor is fixed with the input member, and the output member is fixed with the crank; the crank drives the moving shaft to perform the linear reciprocating movement along the first axis, and the massage head module is mounted at a front of the moving shaft; and wherein the universal coupling comprises an upper rotating bracket, a lower rotating bracket and a rotating block, and the upper rotating bracket is provided with an upper mounting shaft extended upwardly, and the lower rotating bracket is provided with a lower mounting shaft extended downwardly, the lower mounting shaft forms the input member, the tipper mounting shaft forms the output member, and the upper mounting shaft is fixed to the crank, the lower mounting shaft is fixed to the motor; the rotating block is hinged with the upper rotating bracket through the upper rotating shaft, the rotating block is hinged with the lower rotating bracket through the lower rotating shaft, and an axis of the tipper rotating shaft is perpendicular to that of the lower rotating shaft.

14. A hand-held muscle relaxation device comprising: a housing; a power supply, a motor; a massage head module and a power conversion mechanism;

wherein the power conversion mechanism is mounted inside the housing, the power supply is electrically connected with the motor, the motor is provided with a first rotation axis, and the motor drives the massage head module to perform a linear reciprocating movement along a first axis through the power conversion mechanism, the housing comprises a casing and a handle mounted at a side of the casing, the motor is mounted inside the handle and the power supply is mounted inside and transverse to the casing;

a part of the handle mounted on the side of the casing is an opening portion, a bracket is fixed inside the opening portion of the casing;

an end of the motor is connected to the bracket and an opposite end of the motor is suspended in the handle;

the casing comprises an opening portion adjacent to the handle, a base is fixed inside the opening portion of the casing; and the bracket is rotatably connected to the base such that the handle and the bracket are rotatable about a second rotation axis relative to the casing and the base, an acute angle being formed between the second rotation axis and the first rotation axis.

15. The hand-held muscle relaxation device according to claim 14, wherein a first rubber member is provided between the bracket and the opening portion of the handle;

a second rubber member is provided between the bracket and the end of the motor; and aligned holes are defined in the bracket, the second rubber member and the end of the motor to allow a fastener to be extended thereinto to thereby fasten the bracket and the motor together.

16. The hand-held muscle relaxation device according to claim 14, wherein the bracket comprises a lower bracket arranged inside the handle and fixed with the motor, and an upper bracket covering the opening portion of the handle;

a space is formed between the upper bracket and the lower bracket; and the power conversion mechanism is partly accommodated in the space.

17. The hand-held muscle relaxation device according to claim 16, wherein the upper bracket defines an annular groove in an upper surface thereof;

the base comprises an annular wall extending downwardly therefrom; and the annular wall is rotatably received in the annular groove.

18. The hand-held muscle relaxation device according to claim 16, wherein a lower side of the base facing the upper bracket is concaved upwardly; and an upper side of the upper bracket facing the base protrudes upwardly.

19. The hand-held muscle relaxation device according to claim 16, wherein the power conversion mechanism comprises a universal coupling capable of realizing variable-angle power transmission and a crank-slider mechanism capable of converting a rotary movement into the linear reciprocating movement;

the universal coupling is accommodated in the space, the universal coupling comprising a lower rotating bracket, a rotating block and an upper rotating bracket;

the upper rotating bracket is provided with an upper mounting shaft extending upwardly and an upper rotating shaft, the upper mounting shaft being connected to a crank of the crank-slider mechanism;

the lower rotating bracket is provided with a lower mounting shaft extending downwardly and a lower rotating shaft, the lower mounting shaft being fixed to the motor; and the upper rotating bracket is rotatably connected to the rotating block via the upper rotating shaft, and the lower rotating bracket is rotatably connected to the rotating block via the lower rotating shaft.

* * * * *